Oct. 11, 1966  M. KRANZHOFF  3,278,063
SEALING DEVICE
Filed March 26, 1963  2 Sheets-Sheet 1

INVENTOR:
MATTHIAS KRANZHOFF
BY Michael S. Striker
his ATTORNEY

Oct. 11, 1966 M. KRANZHOFF 3,278,063
SEALING DEVICE
Filed March 26, 1963
2 Sheets-Sheet 2
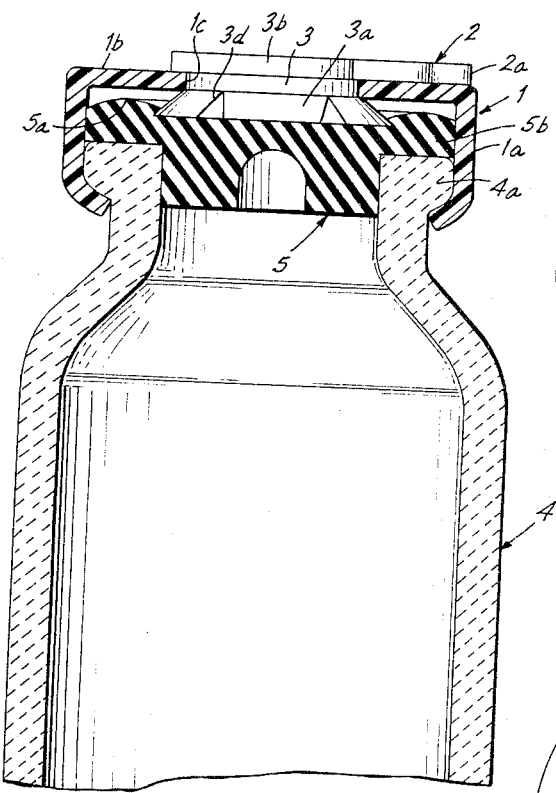
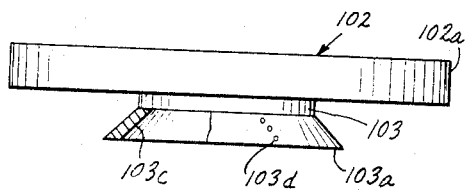
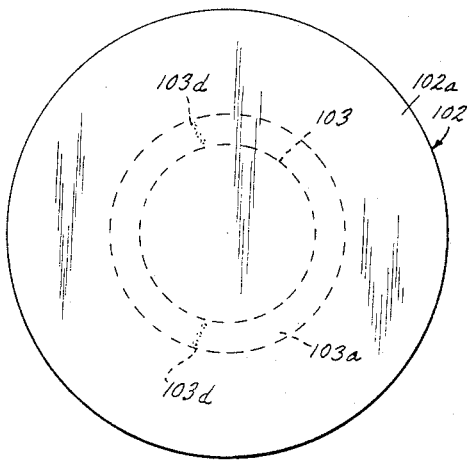
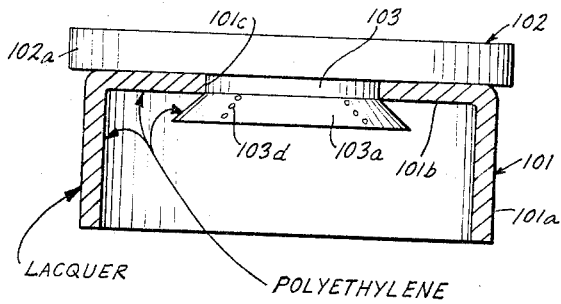
INVENTOR:
MATTHIAS KRANZHOFF
BY Michael S. Striker
his ATTORNEY

United States Patent Office 3,278,063
Patented Oct. 11, 1966

3,278,063
SEALING DEVICE
Matthias Kranzhoff, Gressenich, Kreis Aachen, Germany, assignor to Matthias Faensen Kleinmetallwaren-Fabrikation o.H.G., Gressenich, Kreis Aachen, Germany
Filed Mar. 26, 1963, Ser. No. 267,988
Claims priority, application Germany, Feb. 2, 1963, F 38,912
8 Claims. (Cl. 215—38)

The present invention relates to sealing devices in general, and more particularly to a sealing device which is utilized to provide a seal over the cork or a similar stopper in the neck of a bottle or another container.

It is known to provide vials which contain liquid, granular or pulverulent medicine with stoppers made of rubber or similar elastically deformable material and to thereupon apply a layer of metallic or plastic sheet material around the neck of the vial and over the exposed portion of the stopper in order to prevent entry of foreign matter, to prevent evaporation of the contents, and to indicate that the contents of the vial are untouched. Certain difficulties arise when such layers of sealing material are applied to the vials, particularly if the layers must be applied while hot, because the heat radiated by the such layers may affect the contents of the vial or the material of the stopper. Furthermore, it is often difficult to remove such layers so that a physician or a nurse must waste valuable time in trying to remove the sealing layer with finger nails or with a sharp instrument. It happens again and again that the sharp edges of such layers injure the fingers of nurses, particularly if the layers consist of metallic material or of hard plastic. According to certain other prior proposals of which we are aware of this time, a sealing layer often forms only one component part of a sealing device which normally comprises at least three components and which is assembled at the manufacturing plant to be furnished in fully assembled condition to the pharmaceutical plant, to a bottling plant or to a similar factory where the sealing devices are applied around the necks of bottles and over the exposed portions of stoppers. The present invention relates to improvements in such composite, preassembled sealing devices.

It is an important object of my invention to provide a very simple and inexpensive but highly reliable device which may be applied to many different types of bottles and other containers, which provides a very satisfactory seal around the neck and over the stopper of a bottle, which occupies little space in shipment to a bottling plant, which is not likely to injure the hand of a person who is in charge of separating the sealing device from a container, and which cannot be separated from a container without at least partial deformation of at least one of its components so as to prevent undetected adulteration or unauthorized removal of the contents.

Another object of the invention is to provide a sealing device of the just outlined characteristics which may be separated from a container by exertion of comparatively small force and which is constructed and assembled in such a way that, once applied to a container, neither of its parts can be removed and subsequently restored to its assembled position without leaving readily detectable traces of such removal.

With the above objects in view, one feature of my invention resides in the provision of a sealing device which comprises a cap preferably consisting of thin and readily deformable metallic or synthetic plastic sheet material, and a sealing member which is combined with the cap in such a way that the cap is at least deformed or that the cap is actually destroyed when the sealing member is separated therefrom. The cap comprises a tubular portion which may be applied around the neck of a bottle or a similar container and a cover portion which is surrounded by and which is integral with one axial end of the tubular portion. This cover portion is provided with a substantially centrally located through opening for a median section of the sealing member which latter further comprises a handgrip section adjacent to the outer side of the cover portion and a retaining section which is adjacent to and overlaps the inner side of the cover portion around the opening so that a pull exerted on the handgrip section in a sense to withdraw the retaining section through the opening always brings about at least some deformation or actual tearing of the cover portion.

In accordance with a more specific feature of the invention, the retaining section may be provided with slots which extend outwardly from the opening, or this retaining section may be perforated to facilitate its deformation when the sealing member is assembled with the cap. The strength of the slotted or perforated retaining section must be such that this section deforms or rips the cover portion when it is withdrawn through the opening.

The novel features which are considered as characteristic of the invention are set forth in particular in the appended claims. The improved sealing device itself, however, both as to its construction and its method of application, together with additional features and advantages thereof, will be best understood from the following detailed description of certain specific embodiments with reference to the accompanying drawing, in which:

FIG. 6 is a fragmentary axial section through a bottle or vial which is provided with a sealing device of the type shown in FIG. 5;

FIG. 7 is a side elevational view of a modified sealing member whose perforated retaining section is broken away to show that this sealing member consists at least in part of metallic material;

FIG. 8 is a top plan view of the modified sealing member; and

FIG. 9 is an axial section through a metallic cap which is assembled with the sealing member of FIGS. 7 and 8 to form a slightly different sealing device.

Figure 1:
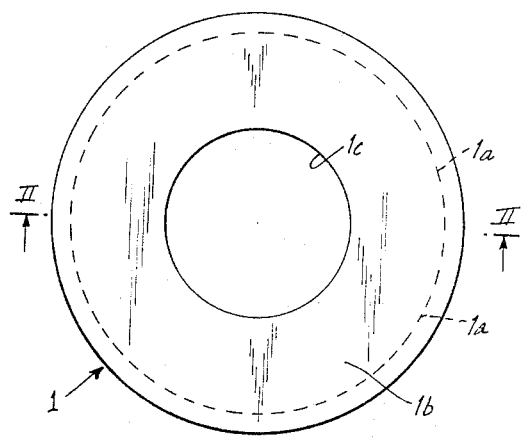
FIG. 1 is a top plan view of a plastic cap forming part of a sealing device which embodies one form of the invention.
Figure 2:
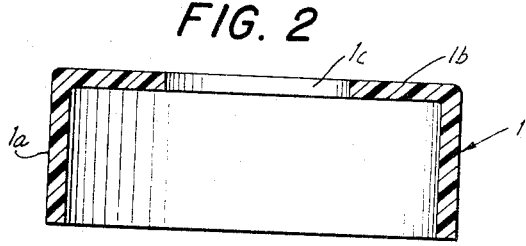
FIG. 2 is an axial section through the cap as seen in the direction of arrows from the line II—II of FIG. 1.

Referring now in greater detail to the illustrated embodiments, and first to FIGS. 1 and 2, there is shown a cap 1 consisting of deformable synthetic plastic material which need not be elastic and which is comparatively thin so as to be readily deformable when it is applied around the neck of a bottle or another container. This cap comprises a tubular portion 1a which preferably assumes the form of a short-cylinder one axial end of which surrounds and is integral with a flat disk-shaped cover portion 1b having a preferably centrally located through opening 1c.

Figure 3:
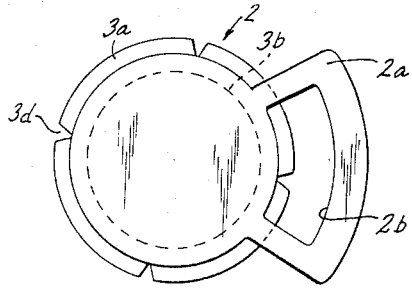
FIG. 3 is a top plan view of a plastic sealing member which may be assembled with the cap of FIGS. 1 and 2 to form a sealing device.
Figure 4:
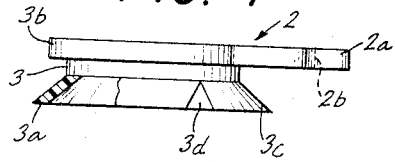
FIG. 4 is a side elevational view of the sealing member with its slotted retaining section partially broken away.
Figure 5:
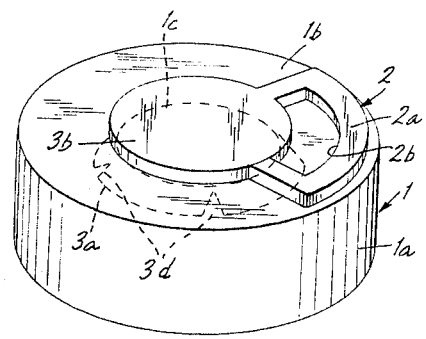
FIG. 5 is a perspective view of a fully assembled sealing device.

The other component of the sealing device assumes the form of a specially configurated sealing member 2 which is shown in FIGS. 3 and 4. This sealing member comprises a median section 3 which is a flat disk of circular shape having a diameter approaching the diameter of the opening 1c. The median section 3 is fitted into the opening 1c when the sealing device of our invention is assembled in a manner as shown in FIG. 5 and the median section is retained in the opening 1c by a preferably hollow conically outwardly diverging retaining section 3a which is rigid with the median section 3 and which is adjacent to the inner side of and overlaps the cover portion 1b around the opening 1c. As shown in FIG. 4, the wall 3c of the retaining section 3a assumes the form of a hollow cone which diverges outwardly in a direction away from the median section 3. The median section is further connected with a handgrip section including a disk-shaped portion 3b which is adjacent to the outer side of and overlaps the cover portion 1b around the opening 1c and a substantially segmental flap 2a which is rigid with and extends laterally of the disk-shaped portion 3b and which is provided with an aperture 2b so as to be more readily grasped by two fingers when the user desires to withdraw the retaining portion 3a through the opening 1c. It will be readily understood that, instead of being formed with a single aperture 2b, the flap 2a may be provided with two or more apertures or with suitable projections which assist the user in firmly grasping the handgrip section of the sealing member. Also, the handgrip section may comprise two or more flaps.

The sealing device of my invention is preferably furnished to a bottling plant in fully assembled condition, i.e., in the condition of FIG. 5. The manner in which the cap 1 and the sealing member 2 may be assembled forms no part of this invention. For example, and as shown in FIG. 4, the diameter of the disk-shaped portion 3b of the handgrip section of the sealing member 2 may be smaller than the diameter of the retaining section 3a but somewhat greater than the diameter of the opening 1c. Consequently, the sealing member may be introduced through the interior of the tubular portion 1a in such a way that the flap 2a is caused to extend through the opening 1c in the first step and that the disk-shaped portion 3b is thereupon forced through the opening so that the edge of the cover member 1b around the opening snaps into the annular gap between the retaining section 3a and the disk-shaped portion 3b, i.e., the median section 3 is then sealingly received in the opening and prevents entry of dust or moisture into the interior of the tubular portion 1a. Alternatively, it is also possible to make the sealing member 2 of two parts and to weld or to otherwise connect such parts to each other once the median section 3 is already introduced into the opening 1c. For example, the retaining section 3a and the median section 3 may form a first unit and the handgrip section 2a, 3b then forms a second unit which is welded to the first unit after the first unit is introduced through the tubular portion 1a so that the median section 3 is accommodated in the opening 1c. It is also possible to form the retaining section with one or more radial slots 3d which permit deformation of the retaining section when the member 2 is assembled with the cap 1. The strength of the slotted section 3a must be sufficient to deform or to rip open the cover portion 1b when the user exerts a pull upon the handgrip section, i.e., on the flap 2a.

The manner in which the sealing device of FIG. 5 is applied to the neck 4a of a bottle or vial 4 is shown in FIG. 6. The neck 4a accommodates a stopper 5 which is made of rubber or a material having the characteristics of rubber. The flange 5b of the stopper 5 overlaps the end face of the neck 4a and the central portion of this flange is deformed by the retaining section 3a of the sealing member 2. The tubular portion 1a of the cap 1 surrounds the annular bead of the neck 4a and its free axial end may be deformed into engagement with the external surface of the bottle to prevent entry of dust between the neck and the tubular portion. The manner of applying the cap 1 is preferably such that the marginal portion of the flange 5b bulges outwardly (as at 5a) because the cap is applied with sufficient force to deform the stopper whereby the retaining section 3a bears against the inner side of the cover portion 1a and seals the opening in 1c.

If the user (say a nurse) desires to open the bottle 4, she grasps the flaps 2a and exerts upon the sealing member 2 a pull in a direction to withdraw the retaining section 3a through the opening 1c. The marginal portions of the cover portion 1b around the opening 1c are then deformed or are ripped outwardly so that the nurse may grasp one of such marginal portions to rip the cover portion 1b all the way to the tubular portion 1a and to thereupon rip the tubular portion prior to withdrawing the stopper 5.

It will be readily understood that, and particularly when the stopper 5 is deformed in response to application of the cap 1 around the neck 4a, it is impossible to restore the sealing member 2 to the position of FIG. 6 once this member was separated from the cap because the expanding stopper will prevent introduction of the retaining section through the opening. Consequently, any unauthorized opening of the bottle will be readily detected because a person tampering with the bottle is simply unable to conceal the fact that the sealing member 2 (and more particularly the retaining section 3a) was withdrawn through the opening 1c.

FIGS. 7 and 8 illustrate a slightly different sealing member 102 which consists of metallic material, for example, aluminum, and whose retaining section 103a again assumes the form of a hollow cone having a thin wall 103c which diverges outwardly in a direction away from a comparatively large disk-shaped handgrip section 102a. This handgrip section is rigid with a flat disk-shaped median section 103 of circular outline which may be fitted into the through opening 101c of a cap 101 in a manner as shown in FIG. 9. This cap consists of metallic material, e.g., sheet aluminum, and its tubular portion 101a may be applied around the neck portion of a vial or another type of container in the same way as illustrated in FIG. 6. The opening 101c is located substantially centrally of the cover portion 101b whose diameter approaches or is slightly less than the diameter of the handgrip section 102a. The retaining section 103a is provided with perforations 103d which are disposed around the opening 101c and which serve the same purpose as the slots 1d. When the user exerts a pull or a tilting force upon the handgrip section 102a in a sense to withdraw the retaining section 103a through the opening 101c, the cover portion 101b will tear and will enable the user to grasp the lifted parts of the cover portion in order to separate the cap 101 from the bottle.

I prefer to coat the outer side of the cap 101 and the exposed portions of the sealing member 102 with a layer of transparent lacquer or other suitable corrosion resistant material which prevents corrosion of the sealing device by preventing direct contact between atmospheric air and the metallic material of the sealing device. Furthermore, it was found that a coat of polyethylene applied to the inner side of the cap 101 and/or to the inner side of the sealing member 102 will protect the fingers against injury because the layer of polyethylene dulls the edges of the metallic parts. This surprising discovery was tested in actual use and it was found again and again that a layer of polyethylene coating the edges of the cap 101 and/or of the sealing member 102 will reduce the sharpness of such edges and will protect the fingers against cuts even if such layer of polyethylene is applied solely to the sealing member 102 (i.e., to the retaining section 103a and to the median section 103) because these sections slide along the edges of the cover portion 101b when the sealing member is withdrawn and coat the edges with polyethylene.

The manner in which the sealing device of FIG. 9 is assembled by the manufacturer for shipment to a bottling plant may be selected at will. For example, the media section 103a may form a prefabricated unit which is secured to the handgrip section 102a subsequent to insertion of the median section 103 into the opening 101c. Also, the perforations 103d allow for deformation and subsequent introduction of the section 103a from the outer side of the cover portion, through the opening 101c and to the inner side of the cover portion. Of course, the retaining section 103a then snaps back and assumes the position of FIG. 9 so as to deform or to destroy the cover portion 101b when it is withdrawn through the opening.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A sealing device for bottles and other types of containers, comprising a cap consisting of sheet metal and including a tubular portion adapted to be applied around the neck of a container, said tubular portion having a lacquer-coated outer side, and a deformable cover portion surrounded by and integral with one axial end of said tubular portion, said cover portion having an inner side, a lacquer-coated outer side and a through opening; and a sealing member having a polyethylene coating comprising a median section removably received in said opening, a handgrip section rigid with said median section and adjacent to the outer side of said cover portion, and a retaining section rigid with said median section and overlapping the inner side of said cover portion around the opening so as to deform the cover portion in response to a pull exerted upon said handgrip section sufficient to bodily withdraw said median section from and said retaining section through the opening in said cover portion while maintaining the integrity of said cover portion.

2. A sealing device as set forth in claim 1, wherein said coating of polyethylene is applied to said retaining section, and to that side of the handgrip section which faces the outer side of said cover portion.

3. A sealing device as set forth in claim 1, wherein said handgrip section has a lacquer-coated outer side.

4. A sealing device as set forth in claim 3, wherein the lacquer applied to said cap and to said sealing member is a transparent lacquer.

5. A sealing device for bottles and other types of containers, comprising a cap which includes a tubular portion adapted to be applied around the neck of a container and having a first and a second axial end, and a deformable cover portion surrounded by and integral with one axial end of said tubular portion, said cover portion having an inner side, an outer side and a through opening; and a sealing member comprising a median section removably received in said opening, a handgrip section rigid with said median section and adjacent to the outer side of said cover portion, said handgrip section comprising a segment-shaped apertured flap extending laterally of said median section toward said tubular portion, and a retaining section rigid with said median section and overlapping the inner side of said cover portion around the opening so as to deform said cover portion in response to a pull exerted upon said handgrip section sufficient to bodily withdraw said median section from and said retaining section through the opening in said cover portion while maintaining the integrity of said cover portion.

6. A sealing device for bottles and other types of containers, comprising a cap which includes a tubular portion adapted to be applied around the neck of a container and having a first and a second axial end, and a deformable cover portion surrounded by and integral with one axial end of said tubular portion, said cover portion having an inner side, an outer side and a through opening; and a sealing member comprising a median section removably received in said opening, a handgrip section rigid with said median section and adjacent to the outer side of said cover portion, and a retaining section rigid with said median section and overlapping the inner side of said cover portion around the opening so as to deform said cover portion in response to a pull exerted upon said handgrip section sufficient to bodily withdraw said median section from and said retaining section through the opening in said cover portion while maintaining the integrity of said cover portion, said retaining section having a thin wall provided with at least one substantially radially extending slot.

7. A sealing device for bottles and other types of containers, comprising a cap which includes a tubular portion adapted to be applied around the neck of a container and having a first and a second axial end, and a deformable cover portion surrounded by and integral with one axial end of said tubular portion, said cover portion having an inner side, an outer side and a through opening; and a sealing member comprising a median section removably received in said opening, a handgrip section rigid with said median section and adjacent to the outer side of said cover portion, and a retaining section rigid with said median section and overlapping the inner side of said cover portion around the opening so as to deform said cover portion in response to a pull exerted upon said handgrip section sufficient to bodily withdraw said median section from and said retaining section through the opening in said cover portion while maintaining the integrity of said cover portion, said retaining section having a perforated wall of substantially conical shape.

8. As a novel article of manufacture for use in sealing devices for bottles and similar containers, a sealing member comprising a polyethylene coated flat median section of circular outline; a polyethylene coated retaining section rigid with one side of and diverging radially outwardly from said median section; and a handgrip section rigid with and located at the other side of said median section.

References Cited by the Examiner

UNITED STATES PATENTS

| | | | |
|---|---|---|---|
| 2,395,149 | 2/1946 | Shaw | 215—38 |
| 2,712,384 | 7/1955 | Corneil | 206—84 |
| 2,752,059 | 6/1956 | Schneider. | |
| 2,848,130 | 8/1958 | Jesnig | 215—47 |
| 3,005,455 | 10/1961 | Poitras et al. | |
| 3,071,274 | 1/1963 | Ravn | 215—37 |

FOREIGN PATENTS 223,054  8/1962  Austria.

JOSEPH R. LECLAIR, *Primary Examiner.*

FRANKLIN T. GARRETT, *Examiner.*

V. A. TOMPSON, D. F. NORTON, *Assistant Examiners.*